United States Patent [19]

Wade

[11] 4,071,402
[45] Jan. 31, 1978

[54] NUCLEAR REACTOR APPARATUS

[75] Inventor: Elman E. Wade, Ruffs Dale, Pa.

[73] Assignee: Westinghouse Electric Corporation, Pittsburgh, Pa.

[21] Appl. No.: 712,442

[22] Filed: Aug. 9, 1976

Related U.S. Application Data

[63] Continuation of Ser. No. 540,203, Jan. 10, 1975, abandoned.

[51] Int. Cl.² ............................................. G21C 19/22
[52] U.S. Cl. ......................................... 176/27; 176/30; 176/87
[58] Field of Search ............................ 176/27, 30–32, 176/36 R, 87

[56] References Cited

U.S. PATENT DOCUMENTS

| 3,054,741 | 9/1962 | Tatlock et al. | 176/30 |
| 3,408,101 | 10/1968 | Savary | 176/36 R |
| 3,514,115 | 5/1970 | Gallo | 176/87 |
| 3,533,530 | 10/1970 | Gallo et al. | 176/87 |
| 3,635,792 | 1/1972 | Barker | 176/32 |
| 3,715,270 | 2/1973 | Jackson | 176/87 |
| 3,819,478 | 6/1974 | Thorel et al. | 176/87 |
| 3,837,694 | 9/1974 | Frisch et al. | 176/87 |
| 3,851,906 | 12/1974 | Frisch et al. | 176/87 |

FOREIGN PATENT DOCUMENTS

| 1,234,243 | 10/1960 | France | 176/30 |
| 1,386,160 | 12/1964 | France | 176/30 |

OTHER PUBLICATIONS

Conf–741087 (10/74) Reactor Enclosure, J. W. Frisch, pp. 20–24.

Primary Examiner—Samuel W. Engle
Assistant Examiner—S. A. Cangialosi
Attorney, Agent, or Firm—M. S. Yatsko; Z. L. Dermer

[57] ABSTRACT

A lifting, rotating and sealing apparatus for nuclear reactors utilizing rotating plugs above the nuclear reactor core. This apparatus permits rotation of the plugs to provide under the plug refueling of a nuclear core. It also provides a means by which positive top core holddown can be utilized. Both of these operations are accomplished by means of the apparatus lifting the top core holddown structure off the nuclear core while stationary, and maintaining this structure in its elevated position during plug rotation. During both of these operations, the interface between the rotating member and its supporting member is sealingly maintained.

10 Claims, 5 Drawing Figures

NUCLEAR REACTOR APPARATUS

This is a continuation of application Ser. No. 540,203 filed Jan. 10, 1975, now abandoned.

BACKGROUND OF THE INVENTION

This invention relates generally to nuclear reactors and more particularly to a lifting, rotating, and sealing apparatus for nuclear reactors utilizing rotating members above the nuclear reactor core.

The nuclear reactor produces heat by fissioning of nuclear material fabricated into fuel elements and assembled within a nuclear core situated in a pressure vessel. In commercial nuclear reactors, heat produced thereby is used to generate electricity. Such nuclear reactors typically comprise one or more primary flow and heat transfer systems, and a corresponding member of secondary flow and heat transfer systems. These secondary heat transfer systems are coupled to conventional steam turbines and electrical generators. A typical energy conversion process for a commercial nuclear reactor, therefore, involves transfer of heat from a nuclear core to a primary coolant flow system, to a secondary coolant flow system, and finally into steam from which electricity is generated.

At the top of the pressure vessel, it is customary to provide a head to seal the nuclear reactor vessel and primary system. A plurality of penetrations pass through the head into the reactor vessel below. These penetrations, typical of which are control rod assemblies and transfer machines, perform functions within the nuclear pressure vessel and the reactor core.

To assure complete access to all areas of the nuclear core, particularly of the liquid metal cooled, breeder type, these penetrations are generally mounted on rotatable members such as rotating plugs. These rotating plugs are cylindrical in nature and of a decreasing size, the innermost plug having the smallest diameter and the outermost plug having the largest diameter. For most efficient operation, each plug is eccentric to the axis of each other plug, and each plug is supported by the next largest plug. The outermost plug is supported by a stationary ring, and is concentric with the ring axis.

During operation, each plug is rotated independently of the other plugs. Additionally, each plug supports penetrations which may rotate independently of the plug.

In conventional nuclear reactors that feature rotating plugs, such as the aforementioned liquid metal cooled reactors, a positive top core holddown is generally not employed. This is because the core holddown structure must be directly over and in contact with the top of the nuclear core during reactor operations, and must be raised prior to rotation during refueling to permit vertical removal of any fuel rod assembly. The difficulty arises because the means of supporting the holddown structure is the rotating plugs themselves. Also, since this rotation and lifting occurs above the nuclear core, all interfaces between the different plugs must be sealed at all times to prevent the escape of any radioactive material.

SUMMARY OF THE INVENTION

Briefly stated, the above disadvantages of the prior art are eliminated by this invention by providing a means for utilizing positive top core holddown with rotating plugs. The plugs, with their top core holddown structures, are lifted by means of a screw type mechanism. While these plugs are in their elevated position, they are rotated. During both the lifting operation and the rotating operation, a gastight seal is maintained in the interface between the rotating plug and its supporting member.

BRIEF DESCRIPTION OF THE DRAWINGS

For a better understanding of the invention, reference may be had to the preferred embodiment, taken in connection with the accompanying drawings, in which.

DESCRIPTION OF THE PREFERRED EMBODIMENT

Figure 1:
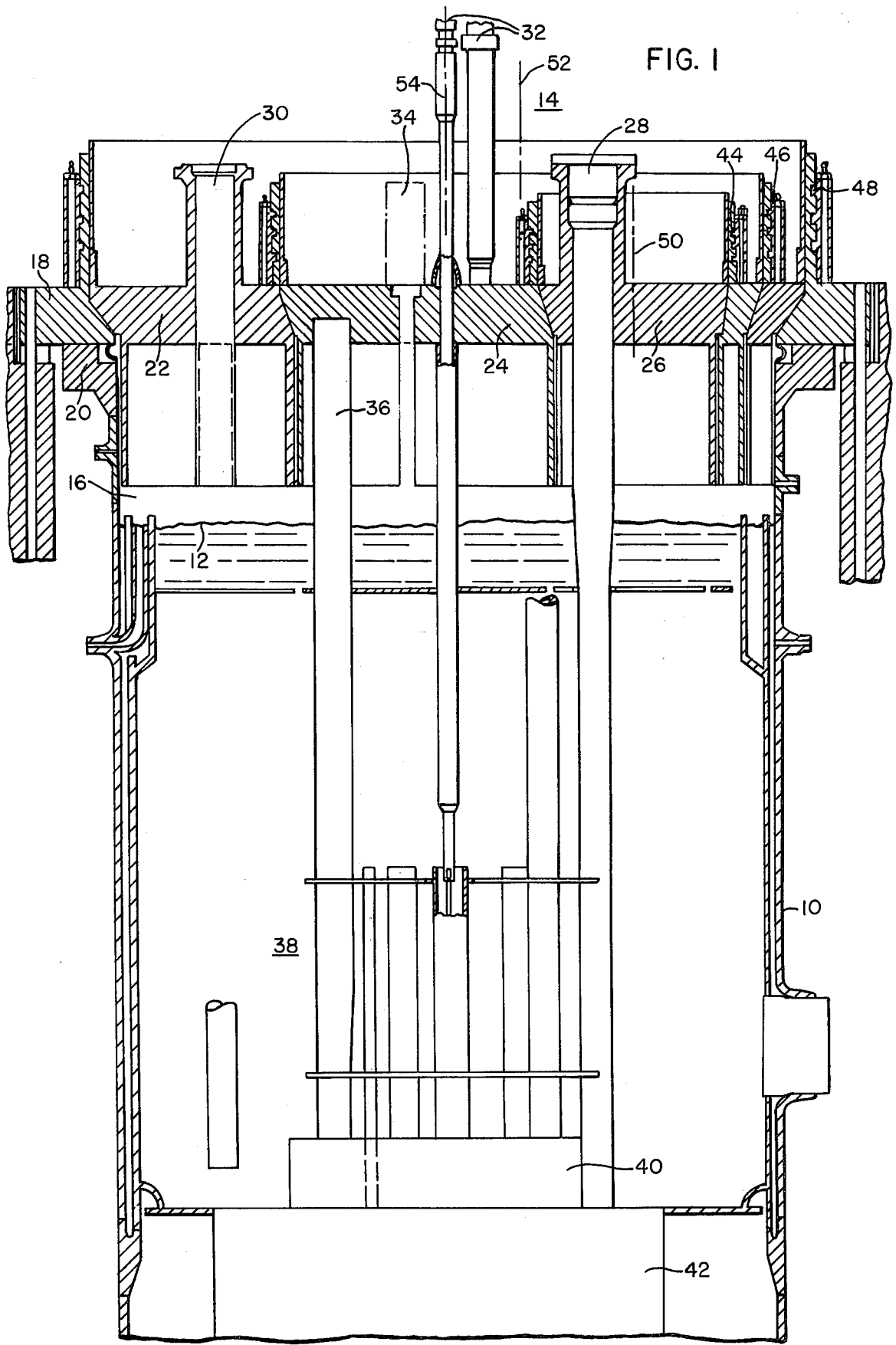
FIG. 1 is a longitudinal section of a nuclear reactor taken along the lines I—I of FIG. 2.

Throughout the description which follows, like reference characters indicate like elements of various figures of the drawings.

FIG. 1 of the drawings illustrates a typical nuclear reactor which can employ the principles of this invention. A nuclear reactor pressure vessel 10 contains a quantity of reactor coolant such as liquid sodium graphically illustrated and designated as numeral 12. The top of the pressure vessel 10 is sealed by a nuclear reactor closure head 14. In the space formed by the pressure vessel 10 and the closure head 14 and above the level of liquid coolant 12 there is maintained a quantity of an inert gas known generally as cover gas 16. The head 14 has a stationary outer member, ring 18, which is bolted to a flange 20 on the pressure vessel 10.

The head 14 has a plurality of cylindrical rotating members such as plugs 22, 24, 26. The plug 22, of the largest diameter, is coaxial with the vessel 10. The stationary outer ring 18, horizontally surrounds and supports the large plug 22. The plug 24, of intermediate diameter, and the plug 26, of smallest diameter, are eccentric to the axis of the vessel 10. The intermediate plug 24 is horizontally surrounded and supported by the large plug 22, and the small plug 26 is horizontally surrounded and supported by the intermediate plug 24. These rotating plugs 22, 24, 26 position the fuel and control handling equipment over all vessel 10 locations.

The small plug 26 supports an in-vessel transfer machine port 28 excentrically. The large plug 22 supports the ex-vessel transfer machine port 30 excentrically. The intermediate plug 24 supports the control rod assembly mechanisms 32, and one or more surveilance ports 34.

As shown, the intermediate plug 24 also supports columns 36 which support the upper internals structure 38. These support columns 36 can, as one skilled in the art will appreciate, be attached to any of the rotating plugs 22, 24, 26. The upper internals 38 position, protect, guide, support, and align the core instrumentation (not shown) and control rod mechanisms 32. The upper internals 38, also function to provide a positive holddown for the core 42 by means of the core holddown support 40.

By rotating the plugs 22, 24, 26, the in-vessel transfer machine port 28 can be positioned over the various components in the vessel 10, and over the ex-vessel transfer machine port 30. The small plug 26 is connected to and supported by the intermediate plug 24 through the load structure 44. The intermediate plug 24 is connected to and supported by the large plug 22 through the load structure 46. The large plug 22 is connected to and supported by the stationary outer ring 18 through the load structure 48.

During refueling operations, the core holddown structure 40 must be vertically raised off its location on top of the core 42 before operations can be undertaken in the core 42. After the structure 40 is raised, rotation of the various plugs 22, 24, 26, to position the mechanisms over their appropriate locations can occur.

Figure 2:
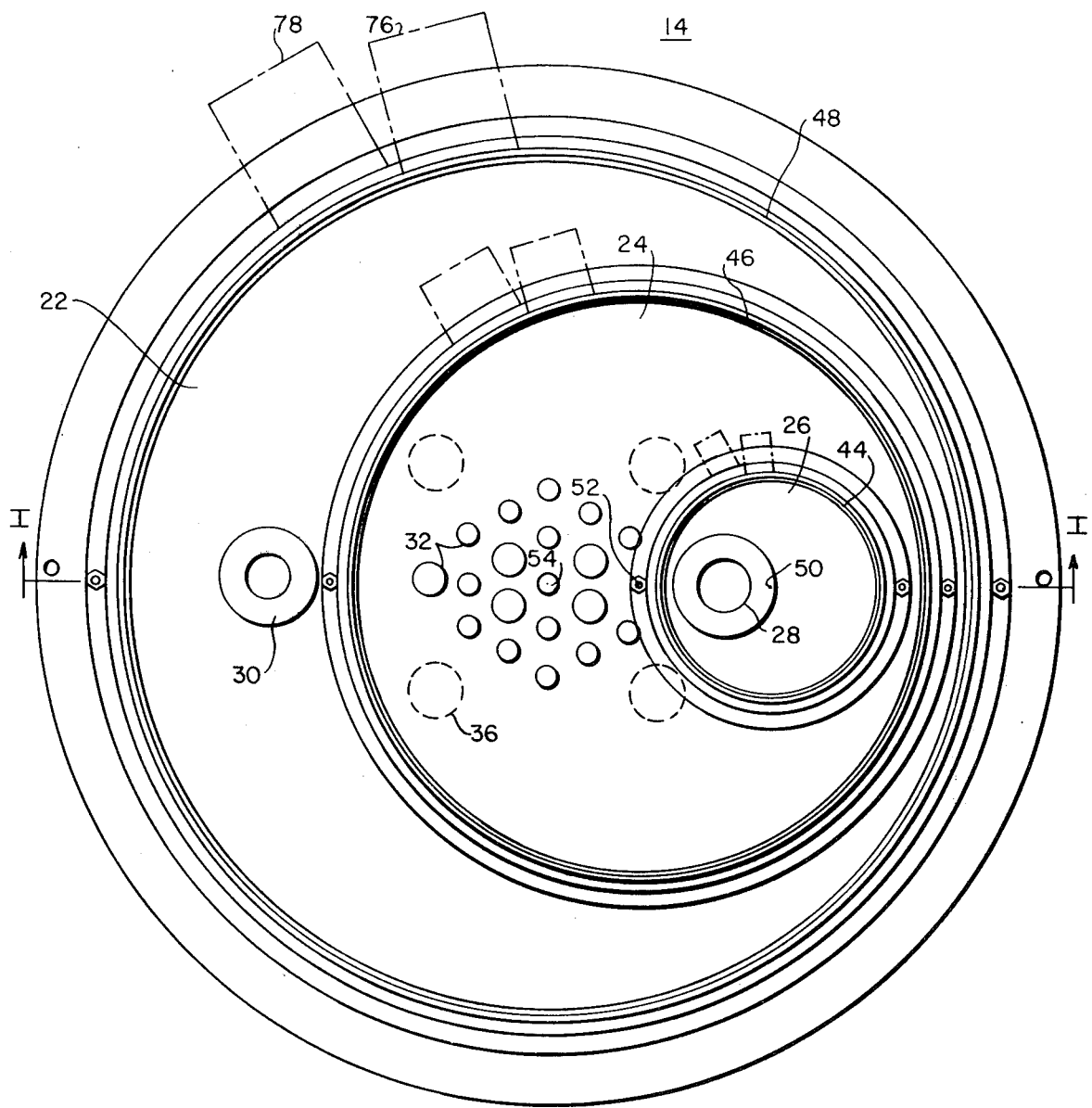
FIG. 2 is a plan view of the top of the reactor head shown in FIG. 1.

FIG. 2, a top view of the closure head 14, illustrates the rotation of the plugs, 22, 24, 26. The smallest diameter plug 26 can rotate about its axis 50 while the intermediate plug 24 remains stationary. The intermediate plug 24 can rotate about its axis 52 while the large plug 22 remains stationary, and the small plug 26 remains in its position on the plug 24. The large plug 22 can rotate about its axis 54 while both plugs 24 and 26 remain fixed in their position on plug 22. In this manner, the plug 26 and its in-vessel transfer machine 28, can be positioned over any desired vessel 10 locations, and the fuel rod assemblies 32 can be positioned over various locations in the core 42. In this manner, access is had to all locations in the reactor vessel 10 and in the core 42. This rotation must occur with the upper internal support columns 36 and the core holddown structure 40 in an elevated position above the core 42.

Figure 3A:
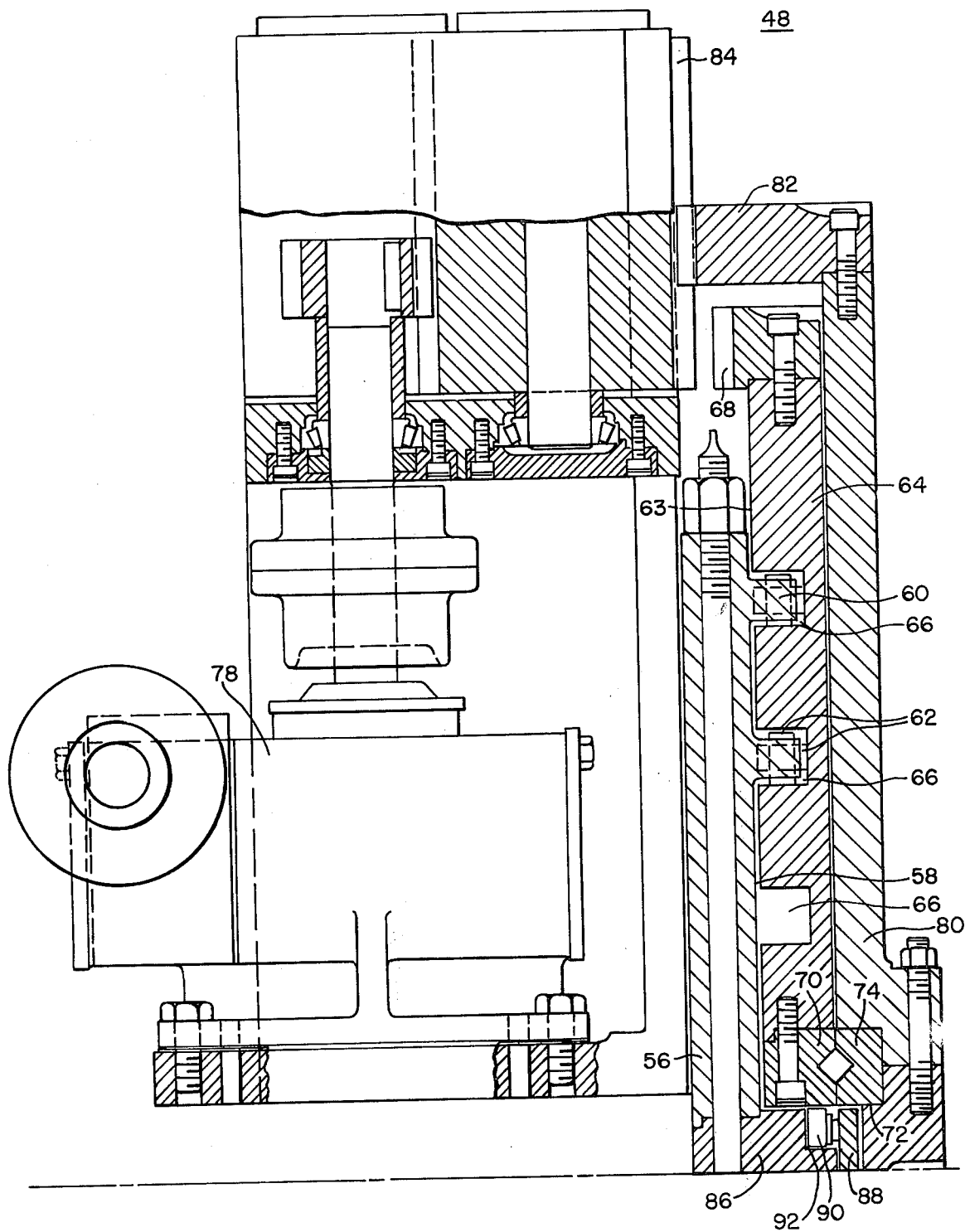
FIGS. 3A and 3B together are a detailed view of the load structure between the large rotating plug and the stationary outer ring.
Figure 3B:
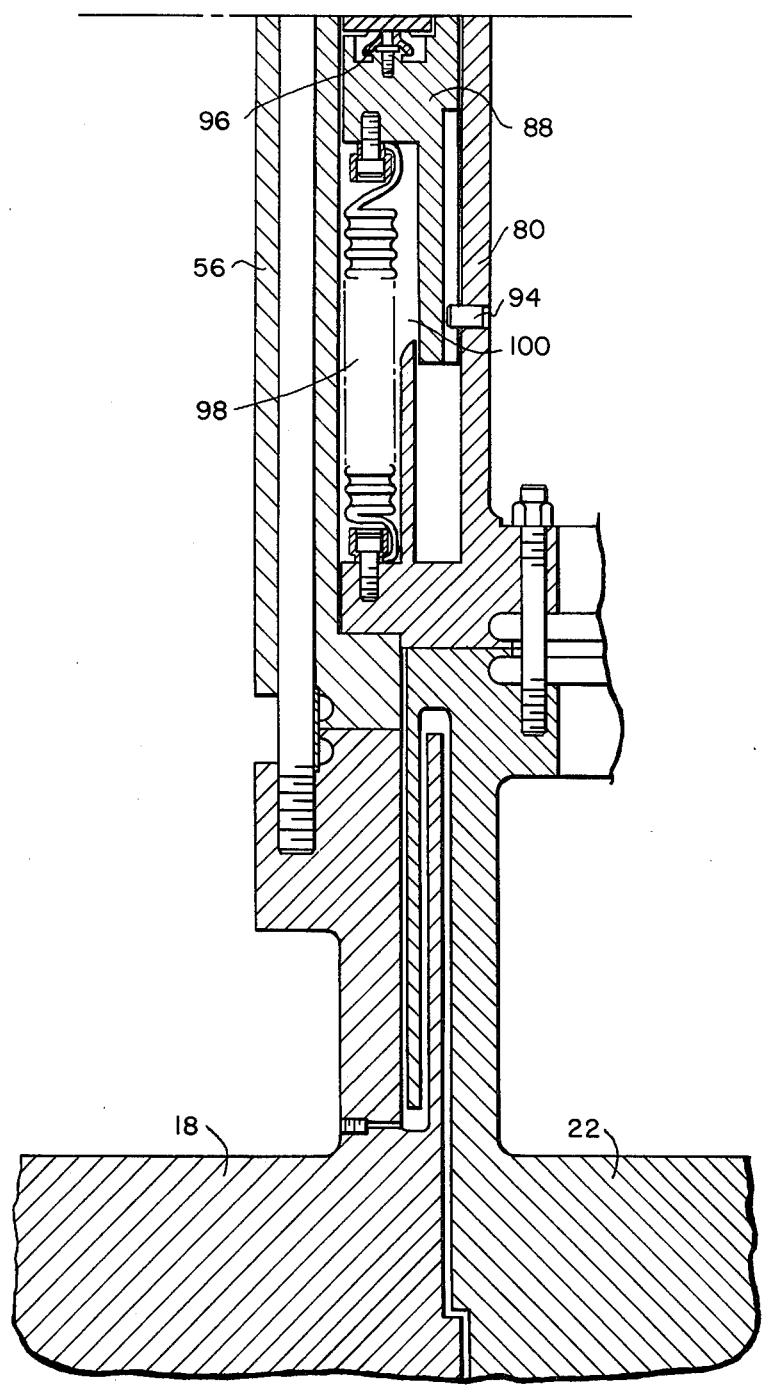

FIGS. 3A and 3B illustrate a detailed view of a load structure 48 between the stationary outer rings 18 and the large plug 22. This load structure 48 is illustrated for descriptive purposes, and it would be obvious to one skilled in the art that a similar load structure may be employed for stationary supporting structures 44 and 46 additionally. Likewise, the load structure 48 may be employed with any rotating member which penetrates the closure head 14.

Figure 4:
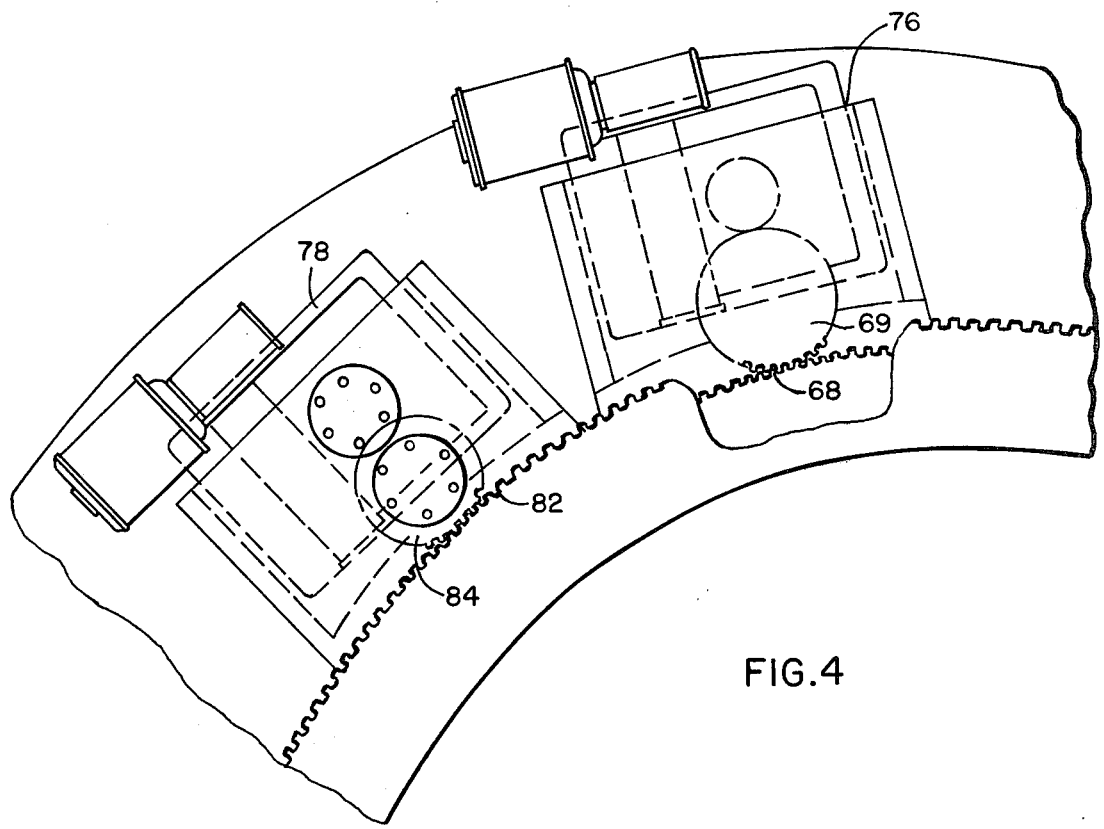
FIG. 4 is a top view of the lifting and rotating gears.

An annular support structure 56 is secured to the stationary outer ring 18 adjacent the entire periphery of central opening therein, and rises vertically above it. Secured to the inner side 58 of the support structure 56 are two rows of lifting bearings 60. The lifting bearings 60 are double cam roller bearings, and the rollers 62 are displaced at 90° angles from each other. The support structure 56 is fixed in its location on the outer ring 18 and does not move. Annular lifting structure 64, cylindrical about the axis 54 of the large plug 22, is located inwardly of the first support structure 56. The lifting structure 64 has a thread 66 on its outward side 63 which is continuous around the lifting structure 64, and is vertically displaced during its length. The thread 66 has dimensions such that the lifting bearings 60 of the first support structure 56 can be inserted therein. At the top of the lifting structure 64, a lifting gear 68 is located. This lifting gear 68 engages a lifting drive gear 69 (FIG. 4) which is part of a conventional driving means 76 such as a motor and gear motor reducer. The bottom of the lifting structure 64 is secured to the outer race 70 of the rotating bearing 72.

The inner race 74 of the rotating bearing 72 is secured to a second support structure 80. This second support structure 80, is cylindrical about the axis 54 of the large plug 22 inward of the lifting structure 64, and is secured to the large rotatable plug 22. At the top of this second support structure 80 is secured a plug gear 82. The plug gear 82 is connected to an idler gear 84 which is part of plug rotating means 78, such as a conventional motor and gear reducer.

To rotate the plug 22, the motor 78 for applying the power is started. The motor 78 turns an idler gear 84. The idler gear 84 is in contact with the plug gear 82. This plug gear 82, which is continuous around the circumference of the second support structure 80, is forced to rotate by the action of the idler gear 84 on it. This rotation of the second support structure 80 causes the rotation of the movable plug 22 to which it is secured.

To raise the core holddown structure 40 (FIG. 1) the plugs 22 and 24 must be raised. The lifting of the plugs 22 and 24 is accomplished through the lifting structure 64 (FIG. 3A). The lifting structure includes a drive means 76 (see FIG. 4) which in this example comprises a conventional motor and gear reducer, which when operated causes the lifting drive gear 69 (FIG. 4) to rotate. The lifting drive gear 69 engages the lifting gear 68 at the top of the lifting structure 64. This action on the lifting gear 68 causes the lifting structure 64 to rotate. Such rotation causes the thread 66 to be vertically displaced. Because the lifting bearing 60 located in the thread 66 are vertically fixed on the first support structure 56, the bearings 60 by their action against the top of the thread 66 lift the entire lifting structure 64. This vertical raising of the lifting structure 64 causes the outer race 70 of the rotating bearing 72 to be lifted with it. This also lifts the inner race 74 of the rotating bearing 72. The lifting of the inner race 74 causes the second support structure 80, which is secured to it, to be raised. Since the second support structure 80 is secured to the large plug 22, the large plug 22 is lifted. The large plus 22 lifts the intermediate plug 24 which is secured to it 22 by load structure 46. The vertical movement of the intermediate plug 24 causes the support columns 36 which are secured to it 24 to be lifted. The lifting of the support columns 36 lifts the attached core holddown structure 40 off its location on top of the core 42.

During rotation of the second support structure 80 and its associated plug 22, the plug 22 is prevented from being raised because the driving means 76 for the lifting structure 64 are not operational. As these driving means 76 are not operational, the lifting gear 68 is held secure in its position against the lifting drive gear 69. During the plug lifting, the plug 22 and its support structure 80 are prevented from rotating because the rotating drive means 78 are not operating. As the rotating drive means 78 are not operational, the idler gear 84 engaged with the plug gear 82 holds the plug gear 82 in its position.

During lifting, means must be utilized to prevent the plug gear 82 of the second support structure 80 from becoming disengaged from the idler gear 84 of the rotational drive means 78. One such means is illustrated in FIG. 3, although other configurations are possible. The idler gear 84 is fabricated such that its vertical length is longer than the maximum vertical movement which the support structure 80 might traverse. In this way, the plug gear 82 slides along the idler gear 84 during vertical movement, and the idler gear 84 acts as a type of sliding spline. In this manner, the rotating means 78, through the idler gear 84, maintain their engagement with the second support structure 80 during vertical movement of the support structure 80.

The structure 80 now provides a positive top core holddown, which can be used during normal operations, and which may be utilized in the unlikely event of a core disruptive accident. Any upward pressure of the core 42 is transferred to the core holddown structure 40. This pressure is then transferred to the support structure 36. The support structure 36 would then attempt to raise the plugs 22, 24, 26. The upward movement of the plug 22 transfers this upward force to the support structure 80. The support structure 80 is secured to the inner race 78 of the rotating bearing 72. The force is then transferred to this inner race 74 and is in turn transferred through the rotating bearing 72 to the outer race 70 of the bearing 72. This force then attempts to raise the lifting structure 64. The thread 66 then exerts an upward force against the lifting bearings 60 located therein. These bearings 60 which are secured to the first support structure 56, transfers this force to the stationary outer ring 18. As the bearings 60, the support structure 56, and the outer ring 18 are designed to withstand such forces, the plug 22 is stopped from any appreciable vertical movement.

The load structures 44, 46, 48 are located above the pressure vessel 10. In such a location, they must be sealed to prevent the escape of any radioactive material from the core 42 and the inside of the pressure vessel 10. They must be sealed both during rotation of the plugs 22, 24, 26 and the lifting of such plugs.

A seal carrier support 86 is secured to the first support structure 56 vertically beneath the outer race 70 of the rotating bearing 72. A seal carrier 88 is located in the interface between the first support structure 56 of the stationary outer ring 18 and the support structure 80 of the large plug 22. This seal carrier 88 has carrier bearings 90 which are secured to it, and which are in rolling contact with the bottom of the outer race 70 and the top of the seal carrier support 86 in a slot 92 provided for it. Carrier tracking pins 94 are in contact with the seal carrier 88 during rotation of the large plug 22 and the support structure 80. A seal 96, such as a form type seal, is secured to the top of the seal carrier 88. This seal 96 is in sliding contact with the seal carrier support 86 during rotation of the seal carrier 88. The seal carrier support 88 is fixed in its location and does not rotate or travel vertically.

A bellows type seal 98 is secured to the bottom of the seal carrier 88 at one end and to the second support structure 80 at its other end.

During rotation of the large plug 22, the seal carrier 88 is carried through the rotation of the large plug 22 by means of the carrier tracking pins 94. The bellows type seal 98 also rotates with the plug 22 because it is secured at both ends to rotating members. The form type seal 96 is carried through the rotation by the seal carrier 88. The seal carrier 88 is maintained in its position by the actions of both the carrier tracking pins 94 and the carrier bearings 90.

During lifting operations, the seal carrier 88 does not move. The movement of the support 80 causes the bellows type seal 98 to retract into the space 100 provided for it between the first support structure 56 and the second support structure 80. In this manner, the interface is sealed at all times.

It can be seen that this invention comprises the means by which a positive top core holddown may be utilized, and by which plugs may be rotated above the nuclear reactor pressure vessel, while maintaining gastight environment within the pressure vessel at all times.

I claim as my invention:

1. Apparatus for independently lifting and rotating members of a nuclear reactor closure head above the nuclear reactor pressure vessel comprising:
    a cylindrical first member;
    a cylindrical, rotatable plug, said first member and said plug being members of said closure head;
    an annular first support structure fixedly secured to said first member, said first support structure having a lifting bearing secured thereto;
    an annular lifting structure having a thread continuous around the outward side of said lifting structure, said thread being vertically displaced along its length, said lifting bearing being located in said thread and engaged therewith;
    a rotating bearing having an inner race and an outer race, said outer race being secured to the inward side of said lifting structure;
    an annular second support structure secured to said plug and to said inner race of said rotating bearing, said lifting structure being continuous around the outward side of said second support structure;
    means for driving said lifting structure;
    means for rotating said second support structure; and
    means for maintaining the engagement of said means for rotating said second support structure and said second support structure during vertical movement of said second support structure.

2. The apparatus according to claim 1 wherein said lifting bearing is a double cam roller bearing.

3. The apparatus according to claim 1 wherein said lifting structure has a lifting gear secured thereto,
    said means for driving said lifting structure includes a lifting drive gear, and
    said lifting drive gear engages said lifting gear.

4. The apparatus according to claim 1 wherein said second support structure has a plug gear secured thereto,
    said means for rotating said second support structure includes an idler gear, and
    said idler gear engages said plug gear.

5. The apparatus according to claim 4 wherein said means for maintaining engagement includes said idler gear,
    said idler gear has a vertical length; and
    said vertical length is larger than the maximum vertical movement of said second support structure.

6. The apparatus according to claim 1 wherein; an interface is formed between said first support structure and said second support structure; and
    means for sealing said interface are located in said interface.

7. The apparatus according to claim 6 wherein said means for sealing said interface comprise;
    a carrier tracking pin secured to said second support structure;
    a seal carrier rotationally coupled to said carrier tracking pin; and
    a first seal, secured to said seal carrier and to said second support structure.

8. The apparatus according to claim 7 wherein said first seal is a bellows seal.

9. The apparatus according to claim 7 wherein said means for sealing said interface further comprise:
    a seal carrier support secured to said first support structure; and
    a second seal, secured to said seal carrier, in sliding contact with said seal carrier support.

10. The apparatus according to claim 9 wherein a carrier roller bearing is secured to said seal carrier in rolling contact with said seal carrier support and said outer race of said rotating bearing.

* * * * *